(12) United States Patent
Iwano et al.

(10) Patent No.: US 10,393,116 B2
(45) Date of Patent: Aug. 27, 2019

(54) SCROLL TYPE FLUID MACHINE

(71) Applicant: Hitachi Industrial Equipment Systems Co., Ltd., Chiyoda-ku, Tokyo (JP)

(72) Inventors: Kiminori Iwano, Tokyo (JP); Yoshio Kobayashi, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 340 days.

(21) Appl. No.: 14/328,102

(22) Filed: Jul. 10, 2014

(65) Prior Publication Data
US 2015/0093269 A1 Apr. 2, 2015

(30) Foreign Application Priority Data
Sep. 30, 2013 (JP) .................................. 2013-202986

(51) Int. Cl.
*F04C 18/02* (2006.01)
*F04C 23/02* (2006.01)
(Continued)

(52) U.S. Cl.
CPC ...... *F04C 18/0215* (2013.01); *F04C 18/0207* (2013.01); *F04C 23/02* (2013.01);
(Continued)

(58) Field of Classification Search
CPC .............. F04C 18/0215; F04C 2240/30; F04C 2240/805; F04C 23/02; F04C 18/0207;
(Continued)

(56) References Cited

U.S. PATENT DOCUMENTS

| | | | |
|---|---|---|---|
| 6,364,644 B1* | 4/2002 | Saito .................. | F04C 18/0215 418/55.1 |
| 2004/0057848 A1* | 3/2004 | Haller ................. | F04C 18/0215 417/410.5 |

(Continued)

FOREIGN PATENT DOCUMENTS

| | | |
|---|---|---|
| CN | 2054586 U | 3/1990 |
| CN | 200966013 Y | 10/2006 |

(Continued)

OTHER PUBLICATIONS

Korean Office Action issued in counterpart Korean Application No. 2014-0085113 dated Oct. 13, 2015 (four (4) pages).
(Continued)

*Primary Examiner* — Dominick L Plakkoottam
(74) *Attorney, Agent, or Firm* — Crowell & Moring LLP

(57) ABSTRACT

A compressor has a compressor body and a motor integrated with one another, with the structure in which the subassembly of the motor portion and the compressor body assembled by positioning centers of the motor and compressor casings with positioning pins. When the deformation of a flange surface of the motor casing is large on a side of the compressor casing, positioning pin holes may have positional dimensions where the positioning is difficult, and the rigidity of the motor casing is increased to avoid change to the dimensional positions of the pin holes of the motor casing after the sub-assembly process. Fastening seats to fasten a motor stator by use of fastening members and ribs to reinforce the fastening seats are thus provided inside the motor casing to increase rigidity of the motor casing and inhibit deformation of the positional dimensions of the positional pin holes.

10 Claims, 3 Drawing Sheets

(51) Int. Cl.
  *H02K 1/18* (2006.01)
  *H02K 7/14* (2006.01)
(52) U.S. Cl.
  CPC ............... *H02K 1/185* (2013.01); *H02K 7/14*
    (2013.01); *F04C 2240/30* (2013.01); *F04C*
    *2240/40* (2013.01); *F04C 2240/805* (2013.01)
(58) Field of Classification Search
  CPC .............. F04C 18/0223; F04C 2240/40; F04C
    2230/60; F04C 18/0292; H02K 1/185;
    H02K 7/14; F01C 1/0207; F01C 1/0215;
    F01C 1/0223
  USPC ................................ 418/55.1–55.5; 417/410.5
  See application file for complete search history.

(56) References Cited

U.S. PATENT DOCUMENTS

| 2007/0201996 | A1* | 8/2007 | Gopinathan | F04C 18/0215 |
| | | | | 418/55.1 |
| 2007/0273239 | A1 | 11/2007 | Kobayashi et al. | |
| 2009/0257900 | A1* | 10/2009 | Beers | F04C 18/0215 |
| | | | | 418/55.2 |
| 2010/0028185 | A1* | 2/2010 | Kobayashi | F04C 18/0215 |
| | | | | 418/55.4 |
| 2012/0009077 | A1* | 1/2012 | Iwano | F04C 18/0215 |
| | | | | 418/55.6 |

FOREIGN PATENT DOCUMENTS

| CN | 101106293 A | 1/2008 |
| CN | 102330679 A | 1/2012 |
| CN | 102447334 A | 5/2012 |
| CN | 202221933 U | 5/2012 |
| CN | 102684330 A | 9/2012 |
| GB | 2 222 728 A | 3/1990 |
| JP | 63-235683 A | 9/1988 |
| JP | 9-32765 A | 2/1997 |
| JP | 2005-291004 A | 10/2005 |
| JP | 2006-274972 A | 10/2006 |
| JP | 2008-138591 A | 6/2008 |
| JP | 2009-257337 A | 11/2009 |
| WO | WO 2012/156010 A1 | 11/2012 |

OTHER PUBLICATIONS

Chinese Language Office Action issued in counterpart Chinese Application No. 201410331150.0 dated Apr. 18, 2016 (8 pages).
Belgian Report dated Jan. 9, 2015, with partial English translation (four (4) pages).
Written Opinion dated Jul. 9, 2014, with partial English translation (four (4) pages).

\* cited by examiner

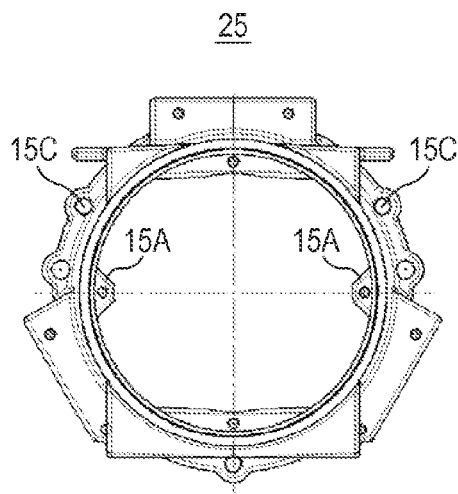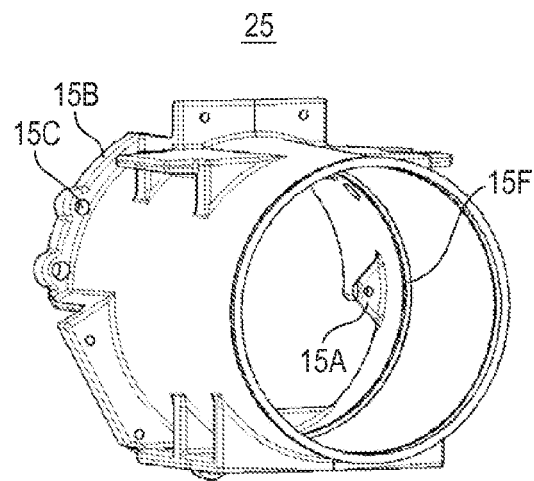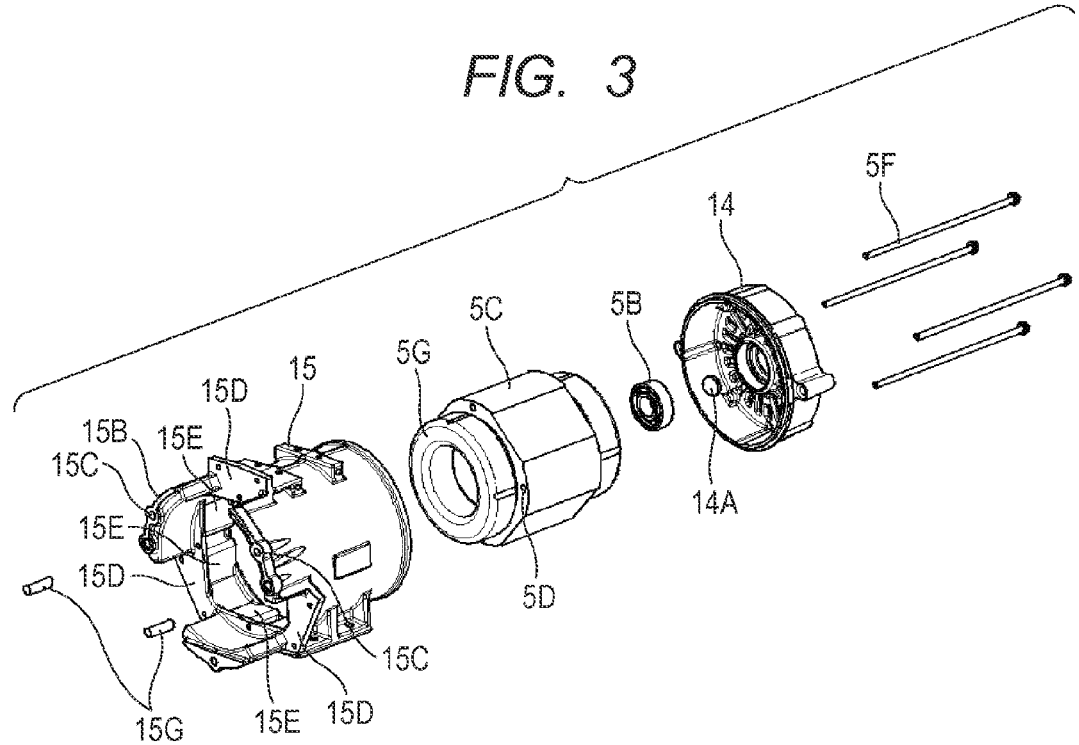

SCROLL TYPE FLUID MACHINE

CLAIM OF PRIORITY

The present application claims priority from Japanese patent application JP 2013-202986 filed on Sep. 30, 2013, the content of which is hereby incorporated by reference into this application.

TECHNICAL FIELD OF THE INVENTION

The present invention relates to a scroll type fluid machine.

BACKGROUND OF RELATED ART

A scroll compressor in which conventional compressor and motor are integrated with one another is disclosed in JP-A No. 2009-257337. JP-A No. 2009-257337 discloses a structure including a compressor body that includes a fixed scroll and an orbiting scroll and a motor portion that rotates the orbiting scroll. The output shaft of the motor is coupled to the drive shaft of the orbiting scroll via the shaft coupling and the cooling fan.

SUMMARY OF THE INVENTION

In the scroll compressor of JP-A No. 2009-257337 in which the compressor and motor are integrated with one another, the motor output shaft and the drive shaft of the orbiting scroll are separated from one another. In its assembly process, the sub-assembly of the motor portion and the compressor body including the compressor casing are assembled in the final process. At this time, the so-called spigot joint is usually provided, in which the centers of the motor casing and compressor casing are positioned using a precisely machined annular convex on one flange portion and a precisely machined annular concave on the other flange portion.

Here, when the spigot joint deforms in the sub-assembly process of the motor casing, the centers may be offset. Therefore, the structure in which positioning pins are used to position the centers can be considered. However, when the deformation of the flange surface of the motor casing on the compressor casing side becomes large due to fastening bolts for the motor stator, the bolts affecting the deformation of the flange surface in the sub-assembly process, the positioning pins may have positional dimensions where the positioning of the motor casing and compressor casing is difficult. Therefore, the motor casing may need to have a shape that achieves high rigidity such that the dimensional positions of the pin holes of the motor casing are not changed after the sub-assembly process.

For addressing the above disadvantage, it is desirable to provide, inside a motor casing, fastening seats where a motor stator is fastened by use of fastening members and ribs that reinforce the fastening seats.

By providing the ribs that reinforce the fastening seats inside the motor casing, the rigidity of the motor casing can be increased, and the change of the positional dimensions of the pin holes used to position the motor casing can be inhibited.

BRIEF DESCRIPTION OF THE DRAWINGS

FIG. 2A shows a rear view of a motor casing as a reference example;

FIG. 2B shows a perspective view of the motor casing as a reference example;

FIG. 3 shows an exploded view of an electric motor of this example;

DESCRIPTION OF PREFERRED EMBODIMENTS

Hereafter, examples of the present invention are described using the drawings.

Figure 1:
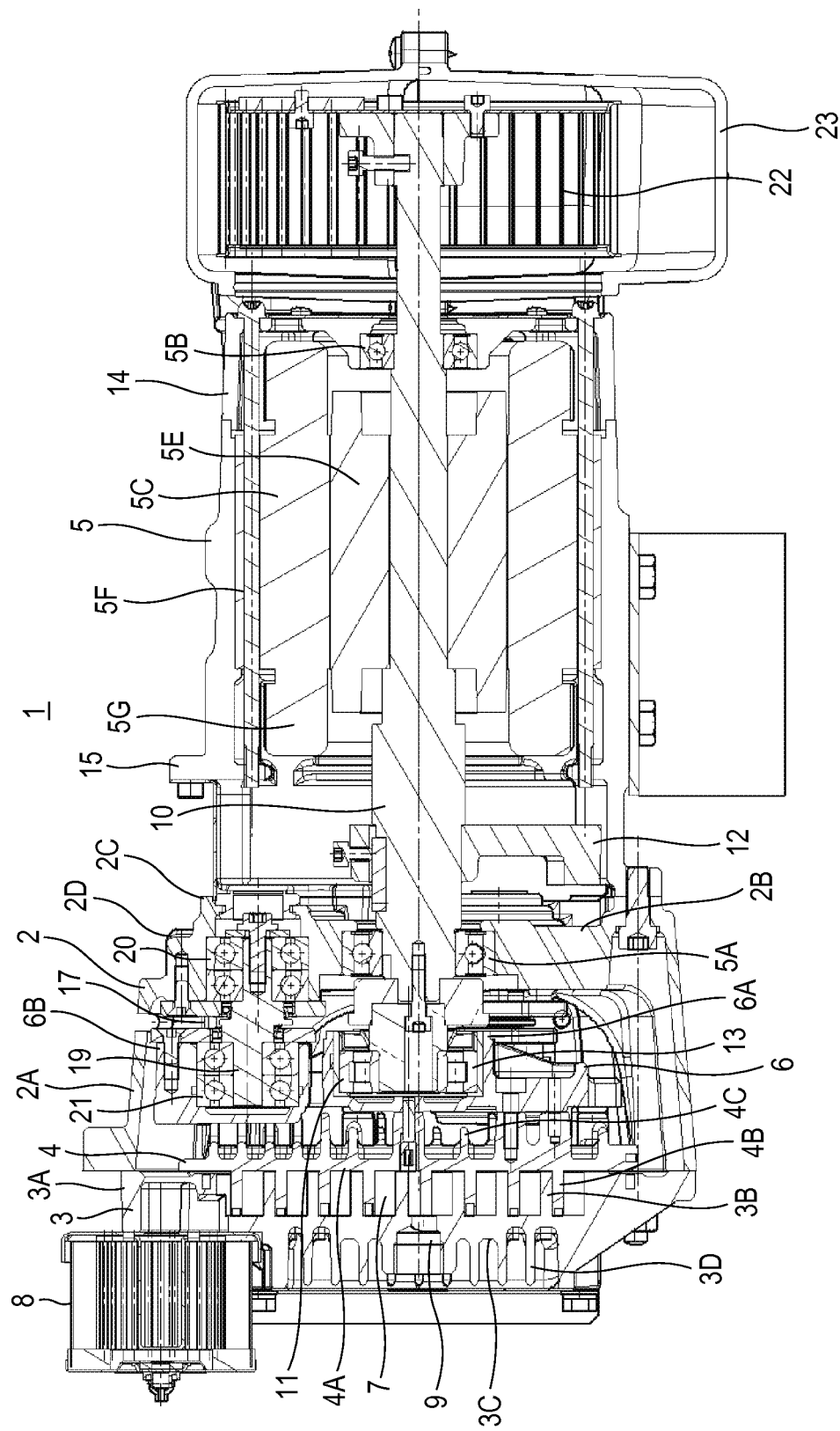
FIG. 1 shows a longitudinal section of a scroll compressor of this example.

FIG. 1 is a longitudinal cross section of a scroll compressor of this example. FIG. 1 shows an entire scroll compressor 1 including a scroll-type air compressor body and an electric motor 5. The air compressor body includes a compressor casing 2, a fixed scroll 3, an orbiting scroll 4, a drive shaft 10, a crank portion 11, and rotation preventing mechanisms 17 that prevent the rotation of the orbiting scroll.

As shown in FIG. 1, the compressor casing 2, which forms an outer shell of the compressor body, is formed as a blind cylindrical body that is closed on the first side in the driving shaft direction and is open on the second side in the driving shaft direction. In other words, the compressor casing 2 mainly includes: a cylindrical portion 2A opened to the second side in the drive shaft direction (on the side of the fixed scroll 3); an annular bottom portion 2B integrally formed to the first side of the cylindrical portion 2A in the drive shaft direction and extending radially inward; and a cylindrical attachment portion 2C for the electric motor 5. The attachment portion 2C projects from the inner perimeter of the bottom portion 2B toward the opposite sides of the drive shaft direction.

Inside the cylindrical portion 2A of the compressor casing 2, the after-mentioned orbiting scroll 4, the crank portion 11, the rotation preventing mechanisms 17, etc. are housed. The multiple rotation preventing mechanisms 17 (only one of which is illustrated in FIG. 1) are disposed toward the bottom portion 2B of the compressor casing 2 at certain intervals circumferentially between the bottom portion 2B and an after-mentioned end plate 4A of the orbiting scroll 4.

Pin holes 2E are precisely machined to the attachment portion 2C to position the compressor casing 2 and a motor casing 15 mentioned later.

Each of the multiple rotation preventing mechanisms 17, provided between the bottom portion 2B of the compressor casing 2 and the back side of the orbiting scroll 4, is formed of, for example, an auxiliary crank 19, an auxiliary crankshaft bearing 20 on the side of the compressor casing 2, and an auxiliary crankshaft bearing 21 on the side of the orbiting scroll 4. The auxiliary crankshaft bearing 20 is housed in a bearing boss 2D provided to the compressor casing 2. The auxiliary crankshaft bearing 21 is housed in a bearing boss 6B provided to the orbiting scroll 4.

The rotation preventing mechanisms 17 prevent the rotation of the orbiting scroll 4, and make the side of the bottom portion 2B of the compressor casing 2 receive a thrust load from the orbiting scroll 4.

The fixed scroll 3 is secured to the open end side of the compressor casing 2 (cylindrical portion 2A) as one scroll member. The fixed scroll 3 mainly includes: an end plate 3A formed to have a disc shape; a spiral lap portion 3B raised on the surface of the end plate 3A; a cylindrical support portion 3C provided to the outer circumference of the end plate 3A to surround the lap portion 3B radially externally and secured to the opening end of the compressor casing 2 (cylindrical portion 2A) by use of, e.g., multiple bolts (not shown); and a cooling fin 3D located oppositely to the lap portion 3B across the end plate 3A.

The orbiting scroll 4 forms another scroll member. The orbiting scroll 4 is provided in the compressor casing 2 oppositely to the fixed scroll 3 in the drive shaft direction and capable of orbiting therein. As shown in FIG. 1, the orbiting scroll 4 includes: the end plate 4A having a disc shape; a lap portion 4B raised on the surface of the end plate 4A, multiple cooling fins 4C raised on the opposite side to the lap portion 4B; and a cylindrical boss plate portion 6 that extends from the back side of the end plate 4A (oppositely to the lap portion 4B) and is attached to the after-mentioned crank portion 11 via an orbiting bearing 13.

The after-mentioned rotation preventing mechanisms 17 are located to the outer diameter side of the boss plate portion 6 in the circumferential direction of the orbiting scroll 4 at predetermined intervals between the boss plate portion 6 and the bottom portion 2B of the compressor casing 2. The center of the boss plate portion 6 of the orbiting scroll 4 is radially offset relative to the center of the fixed scroll 3 by a predetermined dimension (orbital radius).

The orbiting bearing 13 is located between the boss plate portion 6 of the orbiting scroll 4 and the crank portion 11. The orbiting bearing 13 supports a boss portion 6A of the orbiting scroll 4 such that the boss portion 6A is capable of orbiting relative to the crank portion 11, to compensate for the orbiting of the orbiting scroll 4 relative to the axis of the drive shaft 10 by a predetermined orbital radius.

The drive shaft 10 is rotatably provided via bearings 5A and 5B of the electric motor 5 and rotationally driven by the electric motor 5 detachably coupled to the compressor casing 2. The boss portion 6A of the orbiting scroll 4 is coupled to and capable of orbiting relative to the top end side of the drive shaft 10 (the second side in the drive shaft direction) via the after-mentioned crank portion 11 and orbiting bearing 13.

A balance weight 12 is provided to the drive shaft 10 to stabilize the orbiting of the orbiting scroll 4, and rotates together with the drive shaft 10 during compression.

The crank portion 11 is provided integrally with the top end side of the drive shaft 10, and coupled to the boss portion 6A of the orbiting scroll 4 via the orbiting bearing 13. The crank portion 11 rotates together with the drive shaft 10. The rotation at this time is converted into the orbiting of the orbiting scroll 4 via the orbiting bearing 13.

A cooling fan 22 is attached to the rear end of the drive shaft 10, and rotates together with the drive shaft 10 to generate cooling air. The cooling air is guided to the cooling fins 3D of the fixed scroll 3 and the cooling fins 4C of the orbiting scroll 4 by a wind guide duct 23, and passes between the fins and through the boss plate portion 6 on the side of the compressor casing 2 to cool each portion heated by compression heat.

Multiple compression chambers 7 are defined between the lap portion 3B of the fixed scroll 3 and the lap portion 4B of the orbiting scroll 4. As shown in FIG. 1, the compression chambers 7 are located to overlap the lap portion 4B of the orbiting scroll 4 with the lap portion 3B of the fixed scroll 3, and formed to be sandwiched by the end plates 3A and 4A between the lap portions 3B and 4B.

A suction opening 8 is provided to the outer circumference of the fixed scroll 3. The suction opening 8 inspires air from the outside via a suction filter. The air is continuously compressed with the orbiting of the orbiting scroll 4 in each compression chamber 7.

A discharge opening 9 is provided to the central side of the fixed scroll 3. The discharge opening 9 discharges compressed air from the compression chamber 7 at the innermost diameter toward a reservoir (not shown).

The electric motor 5 is provided to the rear of the compressor to rotate the drive shaft 10 supported rotatably by the bearings 5A and 5B.

That is, the orbiting scroll 4 is driven by the electric motor 5 via the drive shaft 10 and crank portion 11, and orbits relative to the fixed scroll 3 while its rotation is prevented by the rotation preventing mechanisms 17.

Thus, the compression chamber 7 at the outer diameter, among the multiple compression chambers 7, inspires air from the suction opening 8 of the fixed scroll 3. The inspired air is continuously compressed in each compression chamber V. The compression chamber 7 at the inner diameter discharges compressed air from the discharge opening 9 located to the central side of the end plate 3A to the outside.

Next, the electric motor portion of this example is explained. As shown in FIG. 1, the electric motor 5 includes a motor stator 5C housed in the motor casing 15 and a rotor 5E provided concentrically with the drive shaft 10.

FIG. 2A shows a rear view of the motor casing as a reference example. FIG. 2B shows a perspective view of the motor casing as a reference example. FIG. 2A is the rear view of the motor casing viewed from the opposite side to the side that is fastened to the compressor casing. FIG. 2B is its perspective view. In FIGS. 2A and 2B, the motor casing 25 includes: a projection 15F that defines the position of the motor stator 5C in the drive shaft direction; fastening seats 15A for fastening bolts 5F, which are fastening members to fasten the motor stator 5C, the fastening seats 15A being located apart from the projection 15F by a certain distance in the drive shaft direction; a flange surface 15B that is a mating surface for the compressor casing 2; and pin holes 15C on the flange surface 15B for the compressor casing, the pin holes 15C being machined precisely to the same size as that of the after-mentioned pin holes 2E of the compressor casing 2 to insert positioning pins for the compressor casing 2.

Here, the assembly sequence of the electric motor 5 is explained. FIG. 3 is an exploded view of the electric motor of this example. In FIG. 3, the motor stator 5C is first inserted into the motor casing 15. The motor stator 5C and projection 15F contact with one another to define the position of the motor stator 5C in the drive shaft direction. After that, a bearing 5B is inserted in a bearing housing 14. The bearing housing 14 then fits with the motor casing 15 into which the motor stator 5C has been inserted. The fastening bolts 5F are introduced into the electric motor 5 from the bearing housing 14 side, and fastened to the fastening seats 15A provided inside the motor casing 15 through bolt penetration holes 5D provided to the bearing housing 14 and motor stator 5C. By fastening the fastening bolts 5F through the penetration holes provided to the bearing housing 14 and motor stator 5C, positioning of the wiring from the motor stator 5C to the power supply and a wiring opening 14A provided to the bearing housing 14 is achieved. The fastening bolts 5F function to prevent rotation of the motor stator 5C during compression. Therefore, rotation preventions such as screws that are to be fastened from the radial direction of the motor stator 5C are unnecessary.

At this time, when the fastening seats 15A are deformed toward the bearing housing 14 by axial tension of the fastening bolts 5F, the flange surface 15B of the motor casing 15 on the side of the compressor casing is deformed. When the flange surface 15B is deformed, the positions of the pin holes 15C are changed not to be positioned with the pin holes 2E, which causes difficult assembly.

On the other hand, to achieve the high efficiency of assembling the scroll compressor, before the assembly of the compressor portion such as the orbiting scroll, the sub-assembly of the motor 5 and the compressor casing 2 are assembled. At that time, a hole or notch may be provided to insert tools etc. in assembling the rotation preventing mechanisms 17 of the orbiting scroll in later processes. In this case, the tools can be easily inserted to the bearings and rotation preventing mechanisms 17 from the hole or notch provided to the motor casing by providing no bearing housing that houses the bearing 5A. However, in that case, since the rigidity of the flange surface of the motor casing becomes lower, the deformation of the flange surface due to the sub-assembly process becomes greater. When the arrangement of the fastening bolts of the motor stator and the holes or notches of the flange surface is irregular, the way of the deformation of the flange surface is complicated because the arrangement greatly affects the deformation of the flange surface in the sub-assembly process. Due to the above factors, the pin holes of the motor casing may have positional dimensions where the positioning of the compressor casing is difficult. It is important to increase the rigidity of the motor casing so that the positional dimensions of the pin holes of the motor casing are not changed after the sub-assembly process.

Figure 4A:
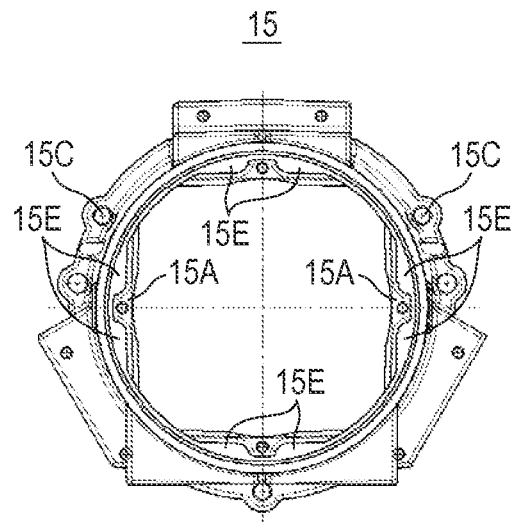
FIG. 4A shows a rear view of the motor casing of this example.
Figure 4B:
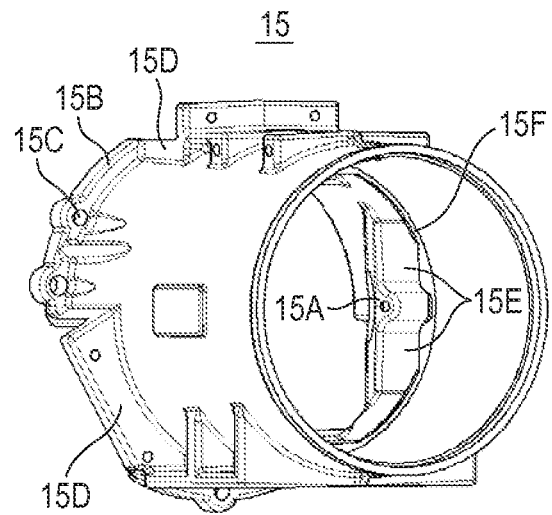
FIG. 4B shows a perspective view of the motor casing of this example.

FIG. 4A shows a rear view of the motor casing of this example. FIG. 4B shows a perspective view of the motor casing of this example. FIG. 4A shows the rear view of the motor casing viewed from the opposite side to the side fastened to the compressor casing. FIG. 4B shows its perspective view. In FIGS. 4A and 4B, the same reference numerals are provided to the same components as FIG. 2. The different point is that ribs 15E are provided to the space between the projection 15F and fastening seats 15A inside the motor casing 15 in the drive shaft direction. Accordingly, the ribs 15E functions to reinforce the fastening seats 15A. The ribs 15E are provided such that the projection 15F and each fastening seat 15A are located apart from one another by a certain distance in the drive shaft direction and integrally coupled to one another. Notched portions 15D on the motor casing 15 to insert tools etc. in assembling the rotation preventing mechanisms 17 communicates with the inside between the rotation preventing mechanisms 17 and motor stator 5C.

Figure 5A:
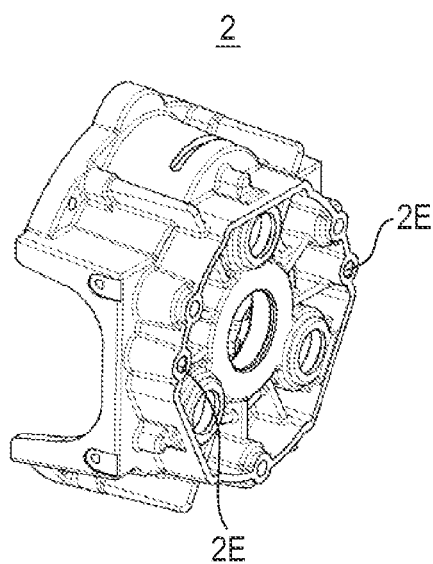
FIG. 5A shows a perspective view of a compressor casing of this example.
Figure 5B:
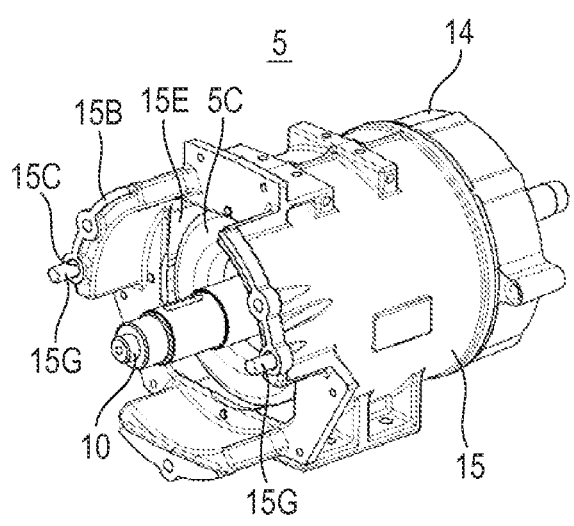
FIG. 5B shows a perspective view of the electric motor.

FIG. 5A shows a perspective view of the compressor casing of this example. FIG. 5B shows a perspective view of the electric motor of this example. FIG. 5A shows a perspective view of the compressor casing of this example. FIG. 5B shows a perspective view of the electric motor of this example. In FIG. 5A, the pin holes 2E for positioning the motor casing 15 are formed to the attachment portion of the compressor casing 2. The attachment portion is a mating surface for the compressor casing 2 and motor casing 15. In FIG. 5B, positioning pins 15G are attached to the pin holes 15C on the flange surface 15B of the motor casing 15. By attaching the positioning pins 15G to the pin holes 2E and pin holes 15C, the pin holes 2E and pin holes 15C are coupled to each other to fasten the compressor casing to motor casing.

As explained above, by providing the ribs that reinforce the fastening seats inside the motor casing, the rigidity of the motor casing can be increased, the positional dimensions of the pin holes 15C of the motor casing can be prevented from changing, and the electric motor 5 and compressor casing 2 can be thus positioned precisely. By providing the ribs 15E inside the motor casing 15, the precision of the positions of the pin holes 15C can be ensured without the increase of the product in size. By providing the ribs to integrally couple to each other the projection 15F and fastening seats 15A located apart from each other in the drive shaft direction, the rigidity of the motor casing can be increased while avoiding the interference between a coil portion 5G provided to the motor stator 5C and the fastening seats 15A. Accordingly, the deformation of the motor casing can be inhibited.

The present invention is not limited to the above examples but includes various modifications. For example, the present invention is applicable to reciprocating compressors and screw compressors as long as they are direct coupled motor type compressors.

What is claimed is:

1. A scroll type fluid machine comprising:
   a fixed scroll;
   an orbiting scroll that is provided oppositely to the fixed scroll and orbits;
   a compressor casing that is secured to the fixed scroll at its opening end;
   a drive shaft driving the orbiting scroll;
   a motor that contains a motor stator, a motor casing, a bearing housing, and fastening bolts;
   wherein an inner wall of the motor casing projects to form a projection, fastening seats, and ribs,
   the fastening bolts fasten the bearing housing, the motor stator, and the fastening seats, in that order,
   the projection contacts with the motor stator from a compressor casing side, and each of the ribs keeps a distance between one of the respective fastening seats and the projection.

2. The scroll type fluid machine according to claim 1, wherein the fastening seats are located apart from the projection in an axial direction of the drive shaft.

3. The scroll type fluid machine according to claim 2, wherein the ribs couple the projection and the fastening seats integrally with each other.

4. The scroll type fluid machine according to claim 1, wherein first pin holes are provided to an attachment portion of the compressor casing, the attachment portion being used as a mating surface for the compressor casing and the motor casing, second pin holes are provided to a flange surface of the motor casing, the flange surface being used as a mating face of the compressor casing and the motor casing, and the first and second pin holes are coupled using positioning pins to fasten the compressor casing and the motor casing to one another.

5. The scroll type fluid machine according to claim 2, wherein first pin holes are provided to an attachment portion of the compressor casing, the attachment portion being used as a mating surface for the compressor casing and the motor casing, second pin holes are provided to a flange surface of the motor casing, the flange surface being used as a mating face of the compressor casing and the motor casing, and the first and second pin holes are coupled using positioning pins to fasten the compressor casing and the motor casing to one another.

6. The scroll type fluid machine according to claim 3, wherein first pin holes are provided to an attachment portion of the compressor casing, the attachment portion being used as a mating surface for the compressor casing and the motor casing, second pin holes are provided to a flange surface of the motor casing, the flange surface being used as a mating face of the compressor casing and the motor casing, and the first and second pin holes are coupled using positioning pins to fasten the compressor casing and the motor casing to one another.

7. The scroll type fluid machine according to claim 1 comprising:
rotation preventing mechanisms that prevent rotation of the orbiting scroll,
wherein a notch is provided on the motor casing to communicate with an inside between the motor stator and the rotation preventing mechanisms.

8. The scroll type fluid machine according to claim 1, wherein a bearing that supports the drive shaft is provided.

9. The scroll type fluid machine according to claim 1, wherein the compressor casing forms an outer shell, first pin holes are provided to an attachment portion of the compressor casing, the attachment portion is used as mating face of the compressor casing and the motor casing, second pin holes are provided to a flange surface of the motor casing, the flange surface is used as mating surfaces of the compressor casing and the motor casing, and the first and second pin holes are coupled by positioning pins to fasten the compressor casing to the motor casing.

10. The compressor according to claim 9, wherein a notch is provided on the motor casing to communicate with an inside.

* * * * *